United States Patent
Wang et al.

(10) Patent No.: US 9,626,515 B2
(45) Date of Patent: Apr. 18, 2017

(54) ELECTRONIC SYSTEM WITH RISK PRESENTATION MECHANISM AND METHOD OF OPERATION THEREOF

(71) Applicant: Samsung Electronics Co., Ltd., Suwon-si, Gyeonggi-Do (KR)

(72) Inventors: Ruoxu Wang, University Park, CA (US); Na Wang, San Jose, CA (US); Hongxia Jin, San Jose, CA (US); Alan Messer, Los Gatos, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 80 days.

(21) Appl. No.: 14/586,723

(22) Filed: Dec. 30, 2014

(65) Prior Publication Data

US 2016/0188883 A1    Jun. 30, 2016

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 5,555,376 A | 9/1996 | Theimer et al. | |
| 5,603,054 A | 2/1997 | Theimer et al. | |
| 5,611,050 A | 3/1997 | Theimer et al. | |
| 5,717,955 A | 2/1998 | Swinehart | |
| 7,299,157 B2 * | 11/2007 | Malik | G06Q 10/06 702/185 |
| 7,409,357 B2 * | 8/2008 | Schaf | G06Q 10/0635 705/7.28 |
| 7,552,480 B1 * | 6/2009 | Voss | G06F 21/577 380/277 |
| 7,945,940 B2 * | 5/2011 | Branzell | G06F 21/604 726/1 |
| 8,181,253 B1 * | 5/2012 | Zaitsev | G06F 21/552 713/152 |
| 8,214,906 B2 * | 7/2012 | Goddard | G06F 11/008 726/22 |
| 8,359,650 B2 * | 1/2013 | Lotem | H04L 63/1433 713/188 |
| 8,713,684 B2 * | 4/2014 | Bettini | G06F 21/57 726/1 |
| 8,725,585 B1 * | 5/2014 | Kay | G06F 21/53 705/26.1 |
| 2003/0233575 A1 * | 12/2003 | Syrjanen | G06F 21/552 726/25 |

(Continued)

*Primary Examiner* — Michael R Vaughan
(74) *Attorney, Agent, or Firm* — IP Investment Law Group

(57) ABSTRACT

An electronic system includes: a control unit configured to: calculating a risk score based on a permission requested by an application, generating a summary presentation based on the risk score for presenting a risk visualization of a privacy risk posed by an application, generating a subcategory presentation based on the risk score for presenting the risk visualization of the privacy risk posed to a device feature by the application, and a user interface, coupled to the control unit, configure to present a risk presentation including the summary presentation, the subcategory presentation, or a combination thereof for displaying on a device.

20 Claims, 7 Drawing Sheets

(56) References Cited

U.S. PATENT DOCUMENTS

| | | | |
|---|---|---|---|
| 2006/0101518 A1* | 5/2006 | Schumaker | G06F 21/577 726/25 |
| 2006/0218640 A1* | 9/2006 | Lotem | H04L 63/1433 726/25 |
| 2010/0235632 A1* | 9/2010 | Iyengar | H04L 9/3213 713/166 |
| 2011/0214183 A1* | 9/2011 | Fudge | G06F 11/008 726/23 |
| 2012/0072991 A1 | 3/2012 | Belani et al. | |
| 2012/0272290 A1* | 10/2012 | Zaitsev | G06F 21/552 726/1 |
| 2013/0111592 A1 | 5/2013 | Zhu et al. | |
| 2013/0185804 A1 | 7/2013 | Biswas et al. | |
| 2013/0212684 A1 | 8/2013 | Li et al. | |
| 2013/0227636 A1 | 8/2013 | Bettini et al. | |
| 2013/0227683 A1 | 8/2013 | Bettini et al. | |
| 2013/0318614 A1 | 11/2013 | Archer et al. | |
| 2013/0325545 A1* | 12/2013 | Mordvinova | G06Q 10/06 705/7.28 |
| 2013/0333039 A1 | 12/2013 | Kelly | |
| 2014/0137257 A1* | 5/2014 | Martinez | H04L 63/1433 726/25 |
| 2014/0289793 A1* | 9/2014 | Moloian | H04L 63/20 726/1 |
| 2014/0344936 A1* | 11/2014 | Thario | G06F 21/577 726/25 |
| 2016/0112451 A1* | 4/2016 | Jevans | H04L 63/1408 726/25 |
| 2016/0127367 A1* | 5/2016 | Jevans | H04L 63/0876 713/152 |

\* cited by examiner

ELECTRONIC SYSTEM WITH RISK PRESENTATION MECHANISM AND METHOD OF OPERATION THEREOF

TECHNICAL FIELD

An embodiment of the present invention relates generally to an electronic system, and more particularly to a system for risk presentation mechanism.

BACKGROUND

Modern portable consumer and industrial electronics, especially client devices such as electronic systems, cellular phones, portable digital assistants, and combination devices are providing increasing levels of functionality to support modern life including location-based information services. Research and development in the existing technologies can take a myriad of different directions.

As users become more empowered with the growth of location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Electronic system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

Thus, a need still remains for an electronic system with risk presentation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a control unit configured to: calculate a risk score based on a permission requested by an application, generate a summary presentation based on the risk score for presenting a risk visualization of a privacy risk posed by an application, generate a subcategory presentation based on the risk score for presenting the risk visualization of the privacy risk posed to a device feature by the application, and a user interface, coupled to the control unit, configure to present a risk presentation including the summary presentation, the subcategory presentation, or a combination thereof for displaying on a device.

An embodiment of the present invention provides a method of operation of an electronic system including: calculating a risk score based on a permission requested by an application with a control unit; generating a summary presentation based on the risk score for presenting a risk visualization of a privacy risk posed by an application; and generating a subcategory presentation based on the risk score for presenting the risk visualization of the privacy risk posed to a device feature by the application for displaying the summary presentation, the subcategory presentation, or a combination thereof on a device.

An embodiment of the present invention provides a non-transitory computer readable medium including instructions for execution by a control unit including: calculating a risk score based on a permission requested by an application; generating a summary presentation based on the risk score for presenting a risk visualization of a privacy risk posed by an application; and generating a subcategory presentation based on the risk score for presenting the risk visualization of the privacy risk posed to a device feature by the application for displaying the summary presentation, the subcategory presentation, or a combination thereof on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
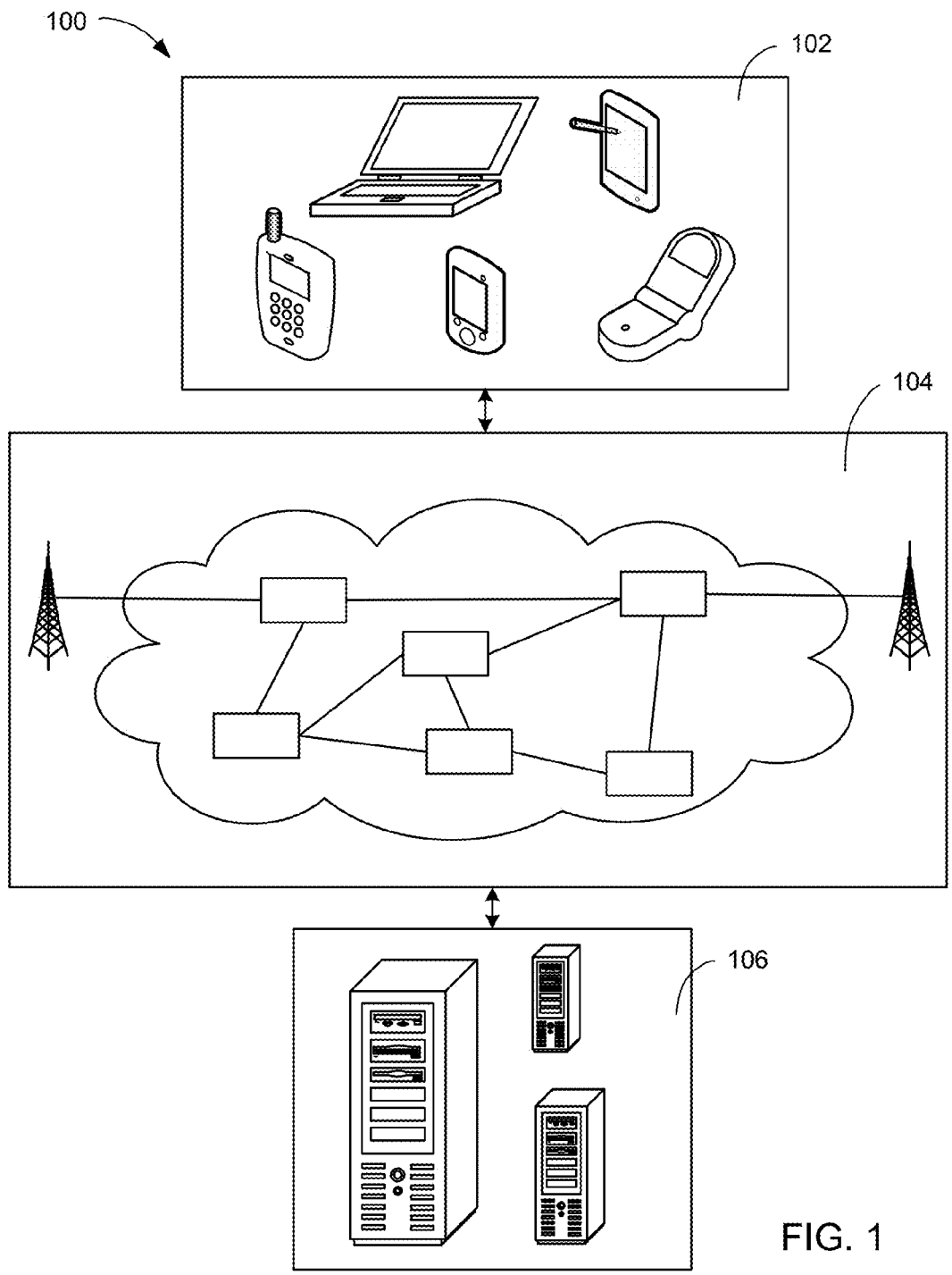
FIG. 1 is an electronic system with risk presentation mechanism in an embodiment of the present invention.

The embodiments of the present invention presents the risk presentation in a multi layered approach by including the summary presentation, the subcategory presentation, or a combination thereof to improve the efficiency of disclosing the privacy risk to the user. By including the subcategory presentation in addition to the summary presentation, the embodiments of the present invention can display an area of the device or a specific instance of the device feature that the privacy of the user is threatened by the application. As a result, the embodiments of the present invention can improve the safety of the user operating the device by informing the privacy risk that the user is experiencing.

The embodiments of the present invention can calculate the risk score based on the permission requested by the application to improve the safety of the user operating the device. By generating the risk score, the embodiments of the present invention can generate the summary presentation to present the risk visualization for the privacy risk posed by the application. Further, the embodiments of the present invention can generate the subcategory presentation for presenting the risk visualization of the privacy risk posed to the device feature. As a result, the embodiments of the present invention can display the summary presentation and the subcategory presentation to inform the privacy risk posed to the user for a safer operation of the device.

The embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "relevant information" referred to herein includes the geographic information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown an electronic system 100 with risk presentation mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a standalone device, or can be incorporated with a vehicle, for example a car, truck, bus, aircraft, boat/vessel, or train. The first device 102 can couple to the communication path 104 to communicate with the second device 106.

For illustrative purposes, the electronic system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, a rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, a personal digital assistant, or a cellular phone, and as specific examples, an Apple iPhone™, Android™ smartphone, or Windows™ platform smartphone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
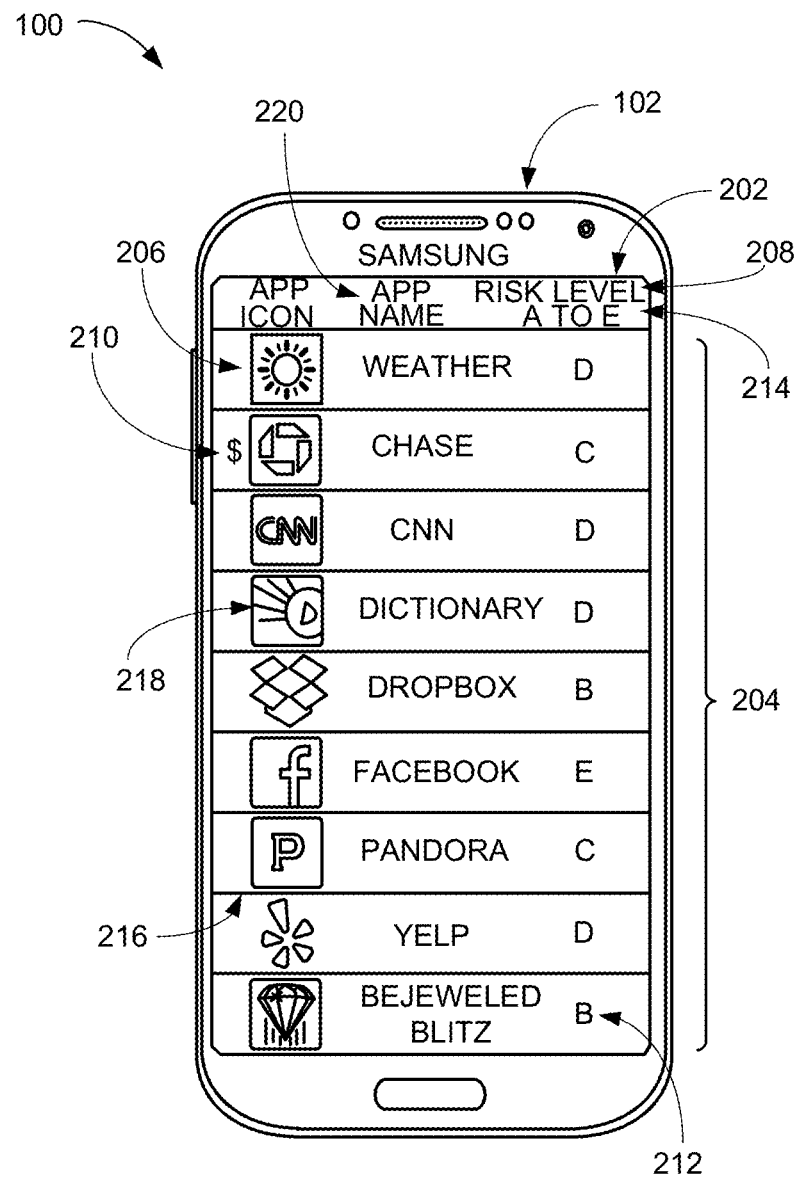
FIG. 2 is an example of a risk presentation.

Referring now to FIG. 2, therein is shown an example of a risk presentation 202. For clarity and brevity, the discussion of the present invention will focus on the first device 102 displaying the result generated by the electronic system 100. However, the second device 106 of FIG. 1 and the first device 102 can be discussed interchangeably.

The risk presentation 202 is as an indicator summarizing a privacy risk 204 posed by an application 206. The privacy risk 204 is a threat to a device of being free from unwanted or undue intrusion. More specifically as an example, the unwanted or undue intrusion can represent an external source gaining access to the first device 102 beyond the scope permitted or desired by the user, the first device 102, the electronic system 100, or a combination thereof.

For example, the risk presentation 202 can present a risk level 208 posed to the first device 102 by the application 206. The application 206 is a software installed on a device. For example, the first device 102 can include the application 206 representing an app. An application type 210 is a classification of the application 206. For example, the application type 210 can include the application 206 for shopping, personal finance, news, music, or a combination thereof.

The risk level 208 is a degree of privacy risk 204 for presenting on a device. For example, the risk level 208 can be represented in a various instances of a risk visualization 212. The risk visualization 212 is a digital representation of illustrating various degrees of the risk level 208. For example, the risk visualization 212 can be represented in various instances of a visualization type 214. The visualization type 214 is a classification of the risk visualization 212. For example, the visualization type 214 can include alphabet values, icons, numeric values, a sliding bar with various coloration, or a combination thereof. The icons can include an icon of a demon, a star, a hazard sign, or a combination thereof.

The risk presentation 202 can be presented based on a presentation layout 216, which is a format for presenting a content. For example, the presentation layout 216 can include linear layout, relative layout, list view, grid view, or a combination thereof. More specifically as an example, the presentation layout 216 can organize the content including an application icon 218, an application information 220, the risk level 208, or a combination thereof.

The application icon 218 is a digital symbol representing the application 206. The application information 220 can include a name of the application 206, a version of the application 206, a developer of the application 206, or a combination thereof.

Figure 3:
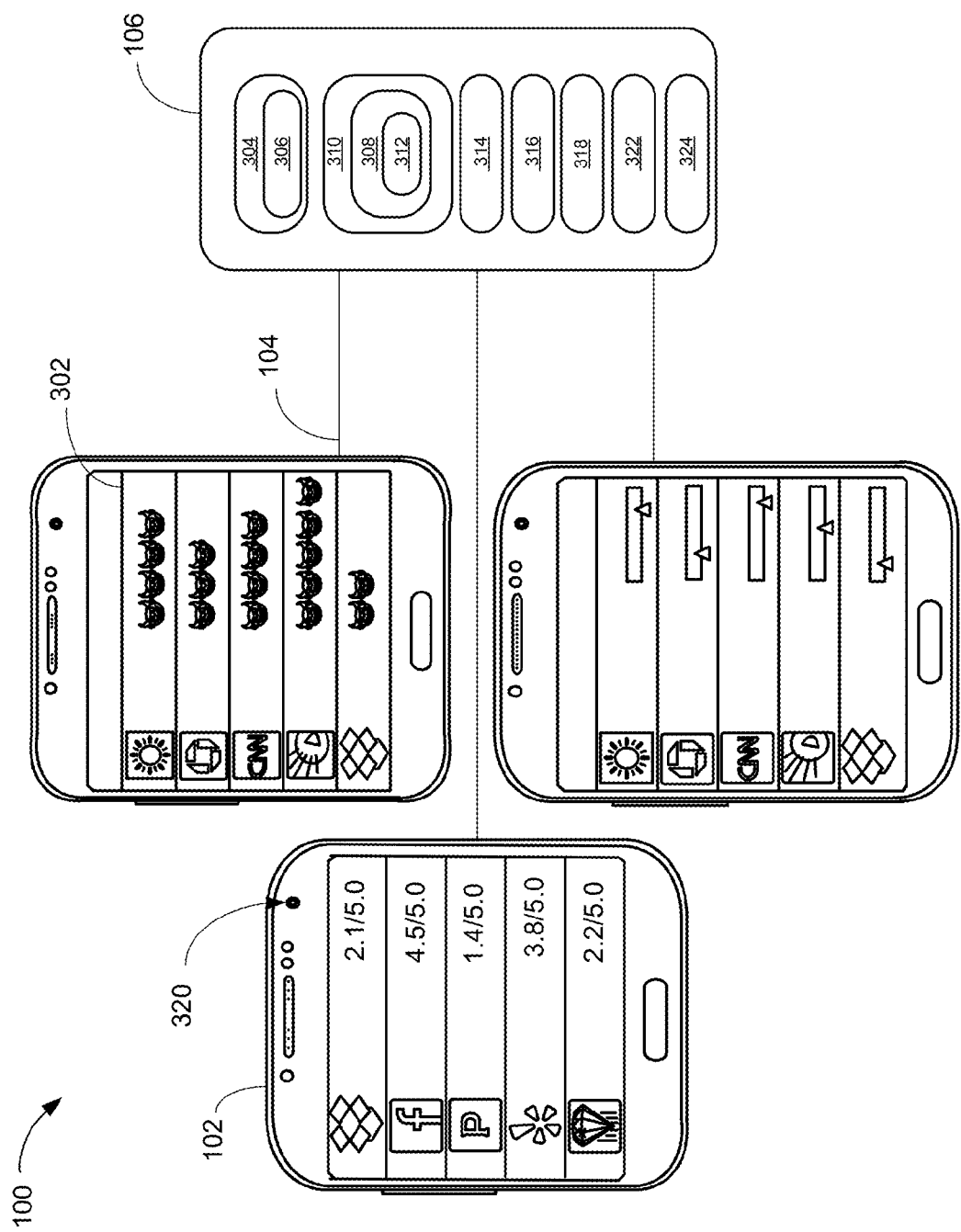
FIG. 3 is examples of a summary presentation.

Referring now to FIG. 3, therein is shown examples of a summary presentation 302. For further example, the figure can represent the first device 102 and the second device 106 communicating via the communication path 104.

The risk presentation 202 of FIG. 2 includes various hierarchical instances of a presentation including the summary presentation 302. The summary presentation 302 is the risk presentation 202 representing an overview of the privacy risk 204 posed to a device by the application 206 of FIG. 2. For example, the summary presentation 302 can present the risk level 208 of FIG. 2 based on a risk score 304 representing an overall score 306. The risk score 304 is a value of the privacy risk 204 calculated by the electronic system 100 based on considering various factors. For example, the risk score 304 can be represented in alphanumeric value.

For example, the risk score 304 can include the overall score 306. The overall score 306 is a comprehensive instance of the risk level 208 for the application 206. The overall score 306 can be represented in alpha numeric value. For example, the overall score 306 for the application 206 representing FACEBOOK™ can represent 4.5 out of 5.0, thus, indicating high privacy risk 204 for the user of the electronic system 100.

As discussed above, the electronic system 100 can consider various factors to calculate the risk score 304. A factor can represent an application file 308 of an application package 310 of the application 206. The application package 310 is a packaged file including a plurality of the application file 308. The application file 308 can represent a source code, an image file, a configuration file, or a combination thereof.

The application file 308 can include a permission 312, which is an authorization granted by the first device 102 to the application 206. For example, the permission 312 can represent the authorization to access the application 206. For a different example, the permission 312 can represent the authorization to access certain information, functionality, or a combination thereof of the application 206, the first device 102, or a combination thereof. A permission level 314 can represent a level of authorization granted. For example, the permission level 314 granted by the first device 102 can differ between one instance of the application type 210 to another instance of the application type 210.

The electronic system 100 can calculate a permission weight 316 based on the permission level 314. The permission weight 316 is an amount of bias provided for the permission 312. For example, the permission weight 316 for the permission 312 requested by the application type 210 representing a social network site can be lower than the permission weight 316 for the permission 312 requested by the application type 210 representing a personal finance.

The electronic system 100 can determine a request purpose 318 based on the permission 312 requested by the application 206. The request purpose 318 is a reason for the application 206 to interact with a device, the electronic system 100, or a combination thereof. For example, the request purpose 318 for the application 206 can represent accessing a device feature 320 of the first device 102.

The device feature 320 is a functionality of the first device 102. More details regarding the device feature 320 will be discussed below. A purpose score 322 is a value calculated by the electronic system 100 based on a relationship between the request purpose 318 and a privacy level 324 placed on the device feature 320. For example, the purpose score 322 can be represented in alphanumeric value.

The privacy level 324 is a degree of privacy permitted to access the device feature 320. For example, the privacy level 324 for the device feature 320 can control the exposure of the device feature 320 accessible by a source external to the first device 102.

Figure 4:
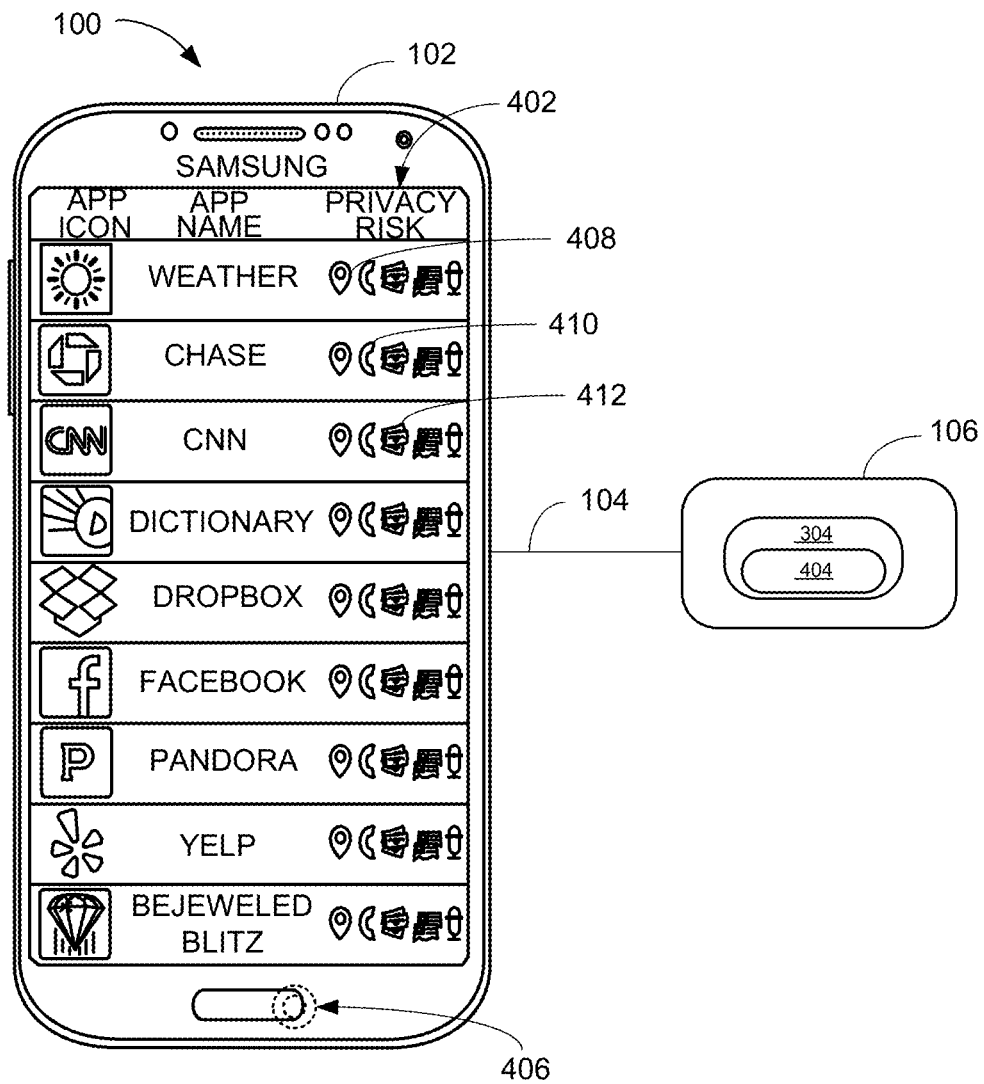
FIG. 4 is an example of a subcategory presentation.

Referring now to FIG. 4, therein is shown an example of a subcategory presentation 402. For further example, the figure can represent the first device 102 and the second device 106 communicating via the communication path 104.

The subcategory presentation 402 is the risk presentation 202 of FIG. 2 presenting the privacy risk 204 posed to the device feature 320 of FIG. 3 by the application 206. For example, the subcategory presentation 402 can present the risk level 208 of FIG. 2 based on the risk score 304 representing a feature specific score 404.

The feature specific score 404 is the risk level 208 posed to the device feature 320 by the application 206 of FIG. 2. For example, the risk visualization 212 of FIG. 2 for the risk level 208 posed to the device feature 320 can be represented based on a change in a coloration of an icon of the device feature 320. More specifically as an example, the coloration can range from red to green where the red can represent a highest risk while the green can represent a lowest risk.

For further example, the summary presentation 302 of FIG. 3 and the subcategory presentation 402 can have a hierarchical relationship. More specifically as an example, the subcategory presentation 402 can represent a more detailed page or subpage to the summary presentation 302. Having a multi layered approach to the risk presentation 202 can aid a multiple level of the risk level 208 to inform the privacy risk 204 posed by the application 206 to the first device 102.

It has been discovered that the electronic system 100 presenting the risk presentation 202 in a multi layered approach by including the summary presentation 302, the subcategory presentation 402, or a combination thereof improves the efficiency of disclosing the privacy risk 204 to the user of the first device 102, the electronic system 100, or a combination thereof. By including the subcategory presentation 402 in addition to the summary presentation 302, the electronic system 100 can display an area of the first device 102 or a specific instance of the device feature 320 that the privacy of the user of the first device 102 is threatened by the application 206. As a result, the electronic system 100 can improve the safety of the user operating the first device 102, the electronic system 100, or a combination thereof by informing the privacy risk 204 that the user is experiencing.

For a specific example, the electronic system 100 can receive a user input 406 to change from the summary presentation 302 to the subcategory presentation 402 or vice versa. The user input 406 can represent a manual input, an audio command, a gesture, or a combination thereof to change from one instance of the risk presentation 202 to another instance of the risk presentation 202 displayed on the first device 102.

The subcategory presentation 402 can organize a content with the presentation layout 216 of FIG. 2. For example, the subcategory presentation 402 can include various instances of the device feature 320 digitally represented, for example as an icon, on the subcategory presentation 402. More specifically as an example, the device feature 320 can include a user's location 408, a device identification 410, a user's personal information 412, or a combination thereof.

The device feature 320, as discussed above, can represent a functionality of a device to provide information regarding the device or a user of the device. For example, the first device 102 can include the device feature 320 to detect the user's location 408. The user's location 408 is a physical location of the first device 102.

For another example, the first device 102 can include the device feature 320 to provide the device identification 410. The device identification 410 is a unique identifier of a device. For example, the device identification 410 can include a product number of the first device 102, a device type of the first device 102, a model number of the first device 102, or a combination thereof.

For a different example, the first device 102 can include the device feature 320 to provide the user's personal information 412. The user's personal information 412 can include the user's identification, such as the phone number, bank account number, email address, social security number, or a combination thereof. For further example, the user's personal information 412 can include the photos stored on the first device 102, the contact list stored on the first device 102, or a combination thereof. The application 206 can request the first device 102 for the permission 312 to access the device feature 320 to obtain information, such as the user's location 408, the device identification 410, the user's personal information 412, or a combination thereof.

Figure 5:
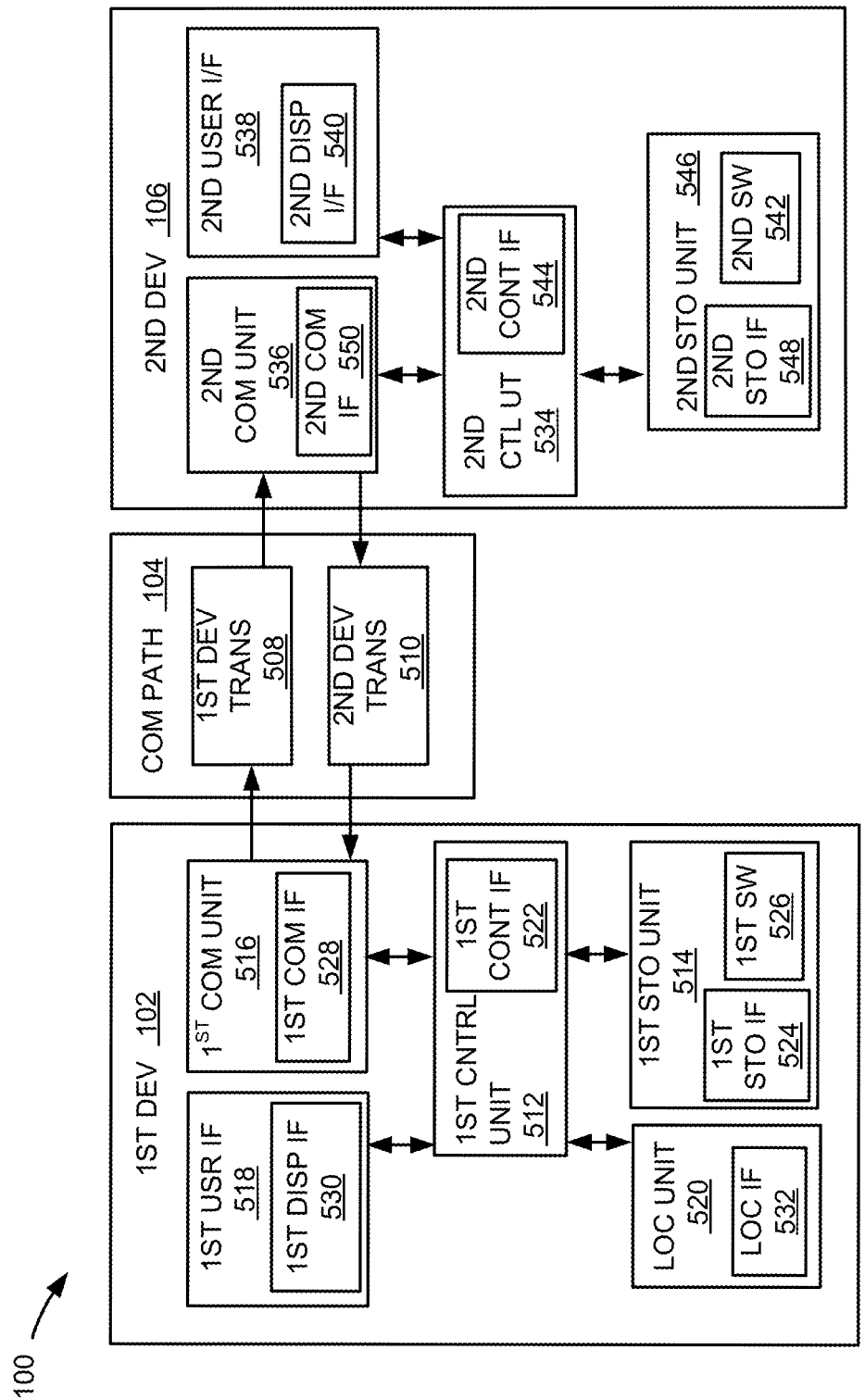
FIG. 5 is an exemplary block diagram of the electronic system.

Referring now to FIG. 5, therein is shown an exemplary block diagram of the electronic system 100. The electronic system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the electronic system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof. The relevant information can also include news, media, events, or a combination thereof from the third party content provider.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the electronic system 100. The first control unit 512 can also execute the first software 526 for the other functions of the electronic system 100, including receiving location information from the location unit 520. The first control unit 512 can further execute the first software 526 for interaction with the communication path 104 via the first communication unit 516.

The second device 106 can be optimized for implementing the embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the electronic system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the electronic system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the electronic system 100 is shown with the second storage unit 546 as a single hierarchy storage system, although it is understood that the electronic system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The electronic system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 520, although it is understood that the second device 102 can also operate the location unit 520.

Figure 6:
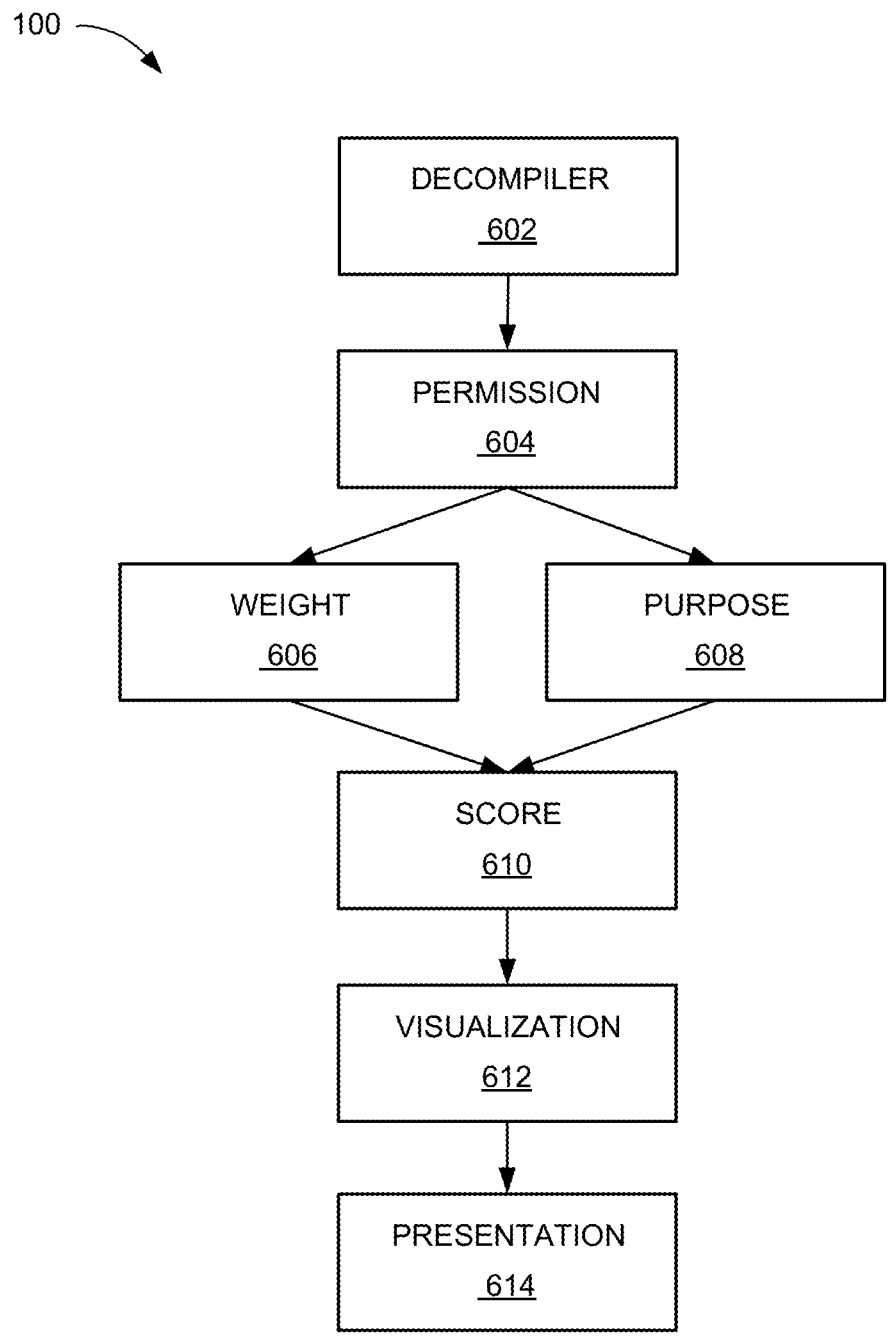
FIG. 6 is a control flow of the electronic system.

Referring now to FIG. 6, therein is shown a control flow of the electronic system 100 of FIG. 1. The electronic system 100 can include a decompiler module 602. The decompiler module 602 extracts the application file 308 of FIG. 3. For example, the decompiler module 602 can extract the application file 308 based on decomposing the application package 310 of FIG. 3 of the application 206 of FIG. 2.

More specifically as an example, the decompiler module 602 can decompose the application package 310 to exact the application file 308 including the source code, the image file, the configuration file, or a combination thereof. The decompiler module 602 can decompose the application package 310 by decompiling the application package 310. The decompiler module 602 can communicate the application file 308 extracted to a permission module 604.

The electronic system 100 can include the permission module 604, which can couple to the decompiler module 602. The permission module 604 obtains the permission 312 of FIG. 3. For example, the permission module 604 can obtain the permission 312 based on the application file 308 extracted.

More specifically as an example, the permission module 604 can obtain the permission 312 based on identifying the application 206 making the request to the first device 102, the electronic system 100, or a combination thereof. As discussed above, the application package 310 of the application 206 can be decomposed to extract the application file 308. The application file 308 can include the information regarding the application 206 making the request. The permission module 604 can obtain the permission 312 requested by the application 206 by identifying the information regarding the permission 312 in the application file 308. The permission module 604 can communicate the permission 312 obtained to a weight module 606, a purpose module 608, or a combination thereof.

The electronic system 100 can include the weight module 606, which can couple to the permission module 604. The weight module 606 calculates the permission weight 316 of FIG. 3. For example, the weight module 606 can calculate the permission weight 316 based on the permission 312 obtained. For further example, a higher value of the permission weight 316 can represent a higher instance of the permission 312 granted. For a different example, a lower value of the permission weight 316 can represent a lower instance of the permission 312 granted. The permission weight 316 can be set to a value between 0.1 and 1.0 with the 1.0 representing the highest value, for example.

The weight module 606 can calculate the permission weight 316 in a number of ways. For example, the weight module 606 can calculate the permission weight 316 based on the application type 210 of FIG. 2 of the application 206 requesting the permission 312. More specifically as an example, based on the application type 210, the permission level 314 of FIG. 3 of the permission 312 permitted to access the first device 102, the electronic system 100, or a combination thereof can differ. Based on the permission level 314 for the application type 210, the weight module 606 can calculate the permission weight 316 of the permission 312 requested by the application 206.

For a different example, the device feature 320 of FIG. 3 can include the privacy level 324 of FIG. 3. Based on the device feature 320, the privacy level 324 can differ. More specifically as an example, some instance of the device feature 320 can have a higher instance of the privacy level 324 than another instance of the privacy level 324. Based on the privacy level 324, the weight module 606 can calculate the permission weight 316 for the permission 312 requested by the application 206 to access the device feature 320. More specifically, the weight module 606 can calculate each instance of the permission weight 316 based on the privacy level 324 for each instance of a plurality of the permission 312 to access the device feature 320. The weight module 606 can communicate the permission weight 316 to a score module 610.

The electronic system 100 can include the purpose module 608, which can couple to the permission module 604. The purpose module 608 detects the request purpose 318 of FIG. 3. For example, the purpose module 608 can detect the request purpose 318 based on the application file 308 including the permission 312.

The purpose module 608 can detect the request purpose 318 in a number of ways. For example, as discussed above, the application file 308 can include information related to the permission 312. More specifically as an example, the application file 308 representing a configuration file can include the request purpose 318 of the application 206 to access the first device 102, the electronic system 100, or a combination thereof.

For a different example, the purpose module 608 can detect the request purpose 318 based on the permission 312 to access the device feature 320. More specifically as an example, the application 206 can request the permission 312 to access the device feature 320 of the first device 102 that provides the user's location 408 of FIG. 4, for example the location unit 520 of FIG. 5. The purpose module 608 can detect the request purpose 318 of the application 206 to represent obtaining the user's location 408.

For another example, the application 206 can request the permission 312 to access the device feature 320 representing the device identification 410 of FIG. 4 of the first device 102, for example the model number. The purpose module 608 can detect the request purpose 318 of the application 206 to represent obtaining the device identification 410 representing the model number to see what kind of the device a user may be using.

For further example, the purpose module 608 can calculate the purpose score 322 of FIG. 3 based on the request purpose 318. The purpose score 322 can be predefined according to the request purpose 318. The purpose score 322 can be set to a value between 1 and 10 with the 10 representing the highest value. More specifically as an example, the higher the privacy level 324 of the device feature 320, the lower the purpose score 322 that the purpose module 608 can calculate for the request purpose 318.

For a specific example, the privacy level 324 representing the access to the device feature 320 to locate the user's location 408 can be a higher privacy than the privacy level 324 representing the access to the device feature 320 of accessing the user's personal information 412 of FIG. 4 representing photos. As a result, the purpose module 608 can calculate the purpose score 322 for the request purpose 318 to access the user's location 408 lower than the purpose score 322 for the request purpose 318 to access the photos. The purpose module 608 can communicate the request purpose 318, the purpose score 322, or a combination thereof to the score module 610.

The electronic system 100 can include the score module 610, which can couple to the weight module 606, the purpose module 608, or a combination thereof. The score module 610 calculates the risk score 304 of FIG. 3. For example, the score module 610 can calculate the risk score 304 based on the permission weight 316, the request purpose 318, or a combination thereof.

The score module 610 can calculate the risk score 304 in a number of ways. For example, the score module 610 can calculate the risk score 304 including the overall score 306 of FIG. 3, the feature specific score 404 of FIG. 4, or a combination thereof.

For a specific example, the score module 610 can calculate the risk score 304 for the application 206, the application type 210, or a combination thereof. More specifically as an example, the score module 610 can calculate the risk score 304 including the overall score 306, the feature specific score 404, or a combination thereof for a particular instance of the application 206.

For example, the application 206 can represent an app for a social networking site. The request purpose 318 for the application 206 can include accessing a plurality of the device feature 320. The purpose score 322 for the request purpose 318 to access each instance of the device feature 320 can be calculated as discussed above. The permission 312 to access the plurality of the device feature 320 can include the user's location 408, the user's personal information 412 including user's identification, photos, contacts, or a combination thereof, a microphone, or a combination thereof.

The score module 610 can calculate the risk score 304 representing the feature specific score 404 for each instance of a plurality of the device feature 320 requested for the permission 312 to access. More specifically as an example, based on the permission weight 316 calculated according to the permission 312 granted to the application 206 to access each instance of the device feature 320, the purpose score 322, or a combination thereof, the score module 610 can calculate the feature specific score 404 for the device feature 320.

For a specific example, the permission weight 316 for the application 206 representing a social networking site can be calculated with a value between 0.1 and 1.0. The purpose score 322 for accessing the user's location 408, the user's personal information 412, or a combination thereof can be set to a value between 1 and 10. The score module 610 can calculate the feature specific score 404 based on the permission weight 316, the purpose score 322, or a combination thereof to determine the risk level 208 of FIG. 2 of the device feature 320. More specifically as an example, the score module 610 can calculate the feature specific score 404 for accessing each instance of a plurality of the device feature 320.

For further example, the score module 610 can calculate the risk score 304 similarly for the application type 210 as the risk score 304 calculated for individual instance of the application 206. More specifically as an example, the score module 610 can calculate the risk score 304 for each instance of the application type 210.

The score module 610 can calculate the risk score 304 representing the overall score 306 based on aggregating a plurality of the feature specific score 404 to determine the risk level 208 of the first device 102. More specifically as an example, the score module 610 can calculate the overall score 306 for the application 206, the application type 210, or a combination thereof. The score module 610 can communicate the risk score 304 to a visualization module 612.

The electronic system 100 can include the visualization module 612, which can couple to the score module 610. The visualization module 612 generates the risk presentation 202 of FIG. 2. For example, the visualization module 612 can generate the risk presentation 202 based on the risk score 304. For further example, the visualization module 612 can generate the risk presentation 202 based on the presentation layout 216 of FIG. 2.

The visualization module 612 can generate the risk presentation 202 in a number of ways. For example, the visualization module 612 can generate the risk presentation 202 including the summary presentation 302 of FIG. 3, the subcategory presentation 402 of FIG. 4, or a combination thereof.

For a specific example, the visualization module 612 can generate the summary presentation 302 including the visualization type 214 of FIG. 2 based on the risk score 304. More specifically as an example, the visualization module 612 can generate the summary presentation 302 by including the application icon 218 of FIG. 2, the application information 220 of FIG. 2, the risk visualization 212 of FIG. 2, or a combination thereof of the application 206.

For a specific example, the visualization module 612 can generate the summary presentation 302 including a plurality of the application icon 218 representing a plurality of the application 206 installed on the first device 102. For further example, the visualization module 612 can generate the summary presentation 302 including the application information 220, such as the name of the application 206, associated with the application icon 218. Furthermore, the visualization module 612 can generate the summary presentation 302 including the risk level 208 based on the risk score 304 representing the overall score 306 associated to the application icon 218, the application information 220, or a combination thereof.

For further example, the visualization module 612 can generate the summary presentation 302 including the overall score 306 displayed according to the risk visualization 212. More specifically as an example, the risk visualization 212 can be presented in various formats according to the visualization type 214. For example, the visualization module 612 can generate the risk visualization 212 in a format of an alphabet, an icon, a numeric value, a sliding bar, or a combination thereof.

For a specific example, the visualization module 612 can generate the risk visualization 212 displayed on the summary presentation 302 based on the overall score 306. As discussed above, the overall score 306 can be calculated based on the permission weight 316, the purpose score 322, or a combination thereof. Furthermore as an example, the lower the value of the overall score 306, the higher the privacy risk 204 of FIG. 2 that the first device 102 can be exposed to. In contrast, the higher the value of the overall score 306, the lower the privacy risk 204 that the first device 102 can be exposed to.

The visualization module 612 can generate the risk visualization 212 according to the overall score 306. More specifically as an example, the visualization module 612 can generate the risk visualization 212 based on the visualization type 214 of alphabet values between A and E, number of icons between 1 and 5, numeric values between 1.0 and 5.0, the sliding bar with coloration ranging between green and red, or a combination thereof to indicate the risk level 208.

For further example, the lower the value of the overall score 306, the visualization module 612 can generate the risk visualization 212 with a higher value to include a higher instance of the privacy risk 204. For example, the risk visualization 212 with an alphabet value of F, a number of demon icons representing 5, a numeric value of 5.0, a sliding bar with a color red, or a combination thereof can represent the highest level of the risk level 208 or the privacy risk 204 posed by the application 206 to the user's privacy on the first device 102.

For further example, the visualization module 612 can generate the summary presentation 302 including the visualization type 214 for risk visualization 212 of one instance of the application 206 different from the visualization type 214 for the risk visualization 212 of another instance of the application 206. For a specific example, the visualization module 612 can generate the risk visualization 212 for the application 206 representing the social network site with the visualization type 214 representing an icon for demon. In contrast, the visualization module 612 can generate the risk visualization 212 for the application 206 representing the news app with the visualization type 214 representing a sliding bar. The visualization module 612 can also generate various instances of the visualization type 214 per instances of the application type 210 similarly as discussed for various instances of the application 206.

The visualization module 612 can generate the summary presentation 302 according to the presentation layout 216. More specifically as an example, the visualization module 612 can organize the summary presentation 302 having each row of the presentation layout 216 to include the application icon 218, the application information 220, the risk visualization 212, or a combination thereof. For a different example, the visualization module 612 can generate the summary presentation 302 for the application type 210 to indicate the risk visualization 212 for each instance of the application type 210 similar to the summary presentation 302 for the application 206.

The visualization module 612 can generate the subcategory presentation 402 similarly to the generation of the summary presentation 302. For example, the visualization module 612 can generate the subcategory presentation 402 including the application icon 218, the application information 220, the risk visualization 212, or a combination thereof.

For further example, the visualization module 612 can generate the subcategory presentation 402 including the risk visualization 212 based on the feature specific score 404. More specifically as an example, the visualization module 612 can generate the subcategory presentation 402 including a plurality of the risk visualization 212 for each instance of the device feature 320 prone to a threat by the application 206 for the privacy risk 204. The visualization module 612 can generate the risk visualization 212 based on the feature specific score 404 to indicate the risk level 208.

For a specific example, the visualization module 612 can generate the risk visualization 212 for the device feature 320 represented in a range of colors between green and red to indicate the risk level 208. More specifically as an example, the risk visualization 212 represented in red can indicate the highest level of the risk level 208 for the device feature 320. As discussed above, similar to the overall score 306, based on the lowest value of the feature specific score 404, the visualization module 612 can generate the risk visualization 212 representing the highest level of the risk level 208.

The visualization module 612 can generate the subcategory presentation 402 organized based on the presentation layout 216. More specifically as an example, the visualization module 612 can display the application icon 218, the application information 220, the risk visualization 212, or a combination thereof in each row of the presentation layout 216. For further example, the visualization module 612 can display a plurality of the risk visualization 212 representing the risk level 208 of each instance of the device feature 320 according to the feature specific score 404. The visualization module 612 can communicate the risk presentation 202 to a presentation module 614.

It has been discovered that the electronic system 100 generating the summary presentation 302 and the subcategory presentation 402 improves the delivery of the privacy risk 204 posed by the application 206 to the user. By having a multi-layer presentation of the risk presentation 202, the user can obtain an overview, detailed information, or a combination thereof of the privacy risk 204 that the user may be threatened. As a result, the user can improve the safety of operating the first device 102, the electronic system 100, or a combination thereof by being informed for the privacy risk 204 involved for using the application 206.

The electronic system 100 can include the presentation module 614, which can couple to the visualization module 612. The presentation module 614 presents the risk presentation 202. For example, the presentation module 614 can display the risk presentation 202 on the first device 102.

For a different example, the presentation module 614 can receive the user input 406 of FIG. 4 to switch the presentation of the risk presentation 202 presented on the first device 102. More specifically as an example, the presentation module 614 can display the summary presentation 302 as a default on the first device 102. The presentation module 614 can receive the user input 406 to switch from the summary presentation 302 to the subcategory presentation 402 to display the risk visualization 212 for the device feature 320.

The physical transformation from switching between the summary presentation 302 and the subcategory presentation 402 based on the user input 406 results in the movement in the physical world, such as people using the first device 102, based on the operation of the electronic system 100. As the movement in the physical world occurs, the movement itself creates additional information that is converted back into generating the risk visualization 212 for the continued operation of the electronic system 100 and to continue movement in the physical world.

The first software 526 of FIG. 5 of the first device 102 of FIG. 5 can include the electronic system 100. For example, the first software 526 can include the decompiler module 602, the permission module 604, the weight module 606, the purpose module 608, the score module 610, the visualization module 612, and the presentation module 614.

The first control unit 512 of FIG. 5 can execute the first software 526 for the decompiler module 602 to extract the application file 308. The first control unit 512 can execute the first software 526 for the permission module 604 to obtain the permission 312. The first control unit 512 can execute the first software 526 for the weight module 606 to calculate the permission weight 316.

The first control unit 512 can execute the first software 526 for the purpose module 608 to detect the request purpose 318. The first control unit 512 can execute the first software 526 for the score module 610 to calculate the risk score 304. The first control unit 512 can execute the first software 526 for the visualization module 612 to generate the risk presentation 202. The first control unit 512 can execute the first software 526 for the presentation module 614 to present the risk presentation 202.

The second software 542 of FIG. 5 of the second device 106 of FIG. 5 can include the electronic system 100. For example, the second software 542 can include the decompiler module 602, the permission module 604, the weight module 606, the purpose module 608, the score module 610, the visualization module 612, and the presentation module 614.

The second control unit 534 of FIG. 5 can execute the second software 542 for the decompiler module 602 to extract the application file 308. The second control unit 534 can execute the second software 542 for the permission module 604 to obtain the permission 312. The second control unit 534 can execute the second software 542 for the weight module 606 to calculate the permission weight 316.

The second control unit 534 can execute the second software 542 for the purpose module 608 to detect the request purpose 318. The second control unit 534 can execute the second software 542 for the score module 610 to calculate the risk score 304. The second control unit 534 can execute the second software 542 for the visualization module 612 to generate the risk presentation 202. The second control unit 534 can execute the second software 542 for the presentation module 614 to present the risk presentation 202.

The electronic system 100 can be partitioned between the first software 526 and the second software 542. For example, the second software 542 can include the decompiler module 602, the permission module 604, the weight module 606, the purpose module 608, the score module 610, and the visualization module 612. The second control unit 534 can execute modules partitioned on the second software 542 as previously described.

The first software 526 can include the presentation module 614. Based on the size of the first storage unit 514, the first software 526 can include additional modules of the electronic system 100. The first control unit 512 can execute the modules partitioned on the first software 526 as previously described.

The first control unit 512 can operate the first communication interface 528 of FIG. 5 to communicate the application file 308, the permission 312, the permission weight 316, the request purpose 318, the risk score 304, the risk visualization 212, the risk presentation 202, or a combination thereof to or from the second device 106. The first control unit 512 can operate the first software 526 to operate the location unit 520. The second communication interface 550 of FIG. 5 to communicate the application file 308, the permission 312, the permission weight 316, the request purpose 318, the risk score 304, the risk visualization 212, the risk presentation 202, or a combination thereof to or from the first device 102.

The first control unit 512 can operate the first user interface 518 of FIG. 5 to present the risk presentation 202 on the first device 102. The second control unit 534 can operate the second user interface 538 to present the risk presentation 202 on the second device 106.

The electronic system 100 describes the module functions or order as an example. The modules can be partitioned differently. For example, the weight module 606 and the purpose module 608 can be combined. Each of the modules can operate individually and independently of the other modules. Furthermore, data generated in one module can be used by another module without being directly coupled to each other. For example, the purpose module 608 can receive the application file 308 from the decompiler module 602. The word "communicating" can represent sending, receiving, or a combination thereof.

The modules described in this application can be hardware implementation or hardware accelerators in the first control unit 512 or in the second control unit 534. The modules can also be hardware implementation or hardware accelerators within the first device 102 or the second device 106 but outside of the first control unit 512 or the second control unit 534, respectively as depicted in FIG. 5. However, it is understood that the first device 102, the second device 106, or a combination thereof can collectively refer to all hardware accelerators for the modules. Furthermore, the first device 102, the second device 106, or a combination thereof can be implemented as software, hardware, or a combination thereof.

The modules described in this application can be implemented as instructions stored on a non-transitory computer readable medium to be executed by the first device 102, the second device 106, or a combination thereof. The non-transitory computer medium can include the first storage unit 514, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Figure 7:
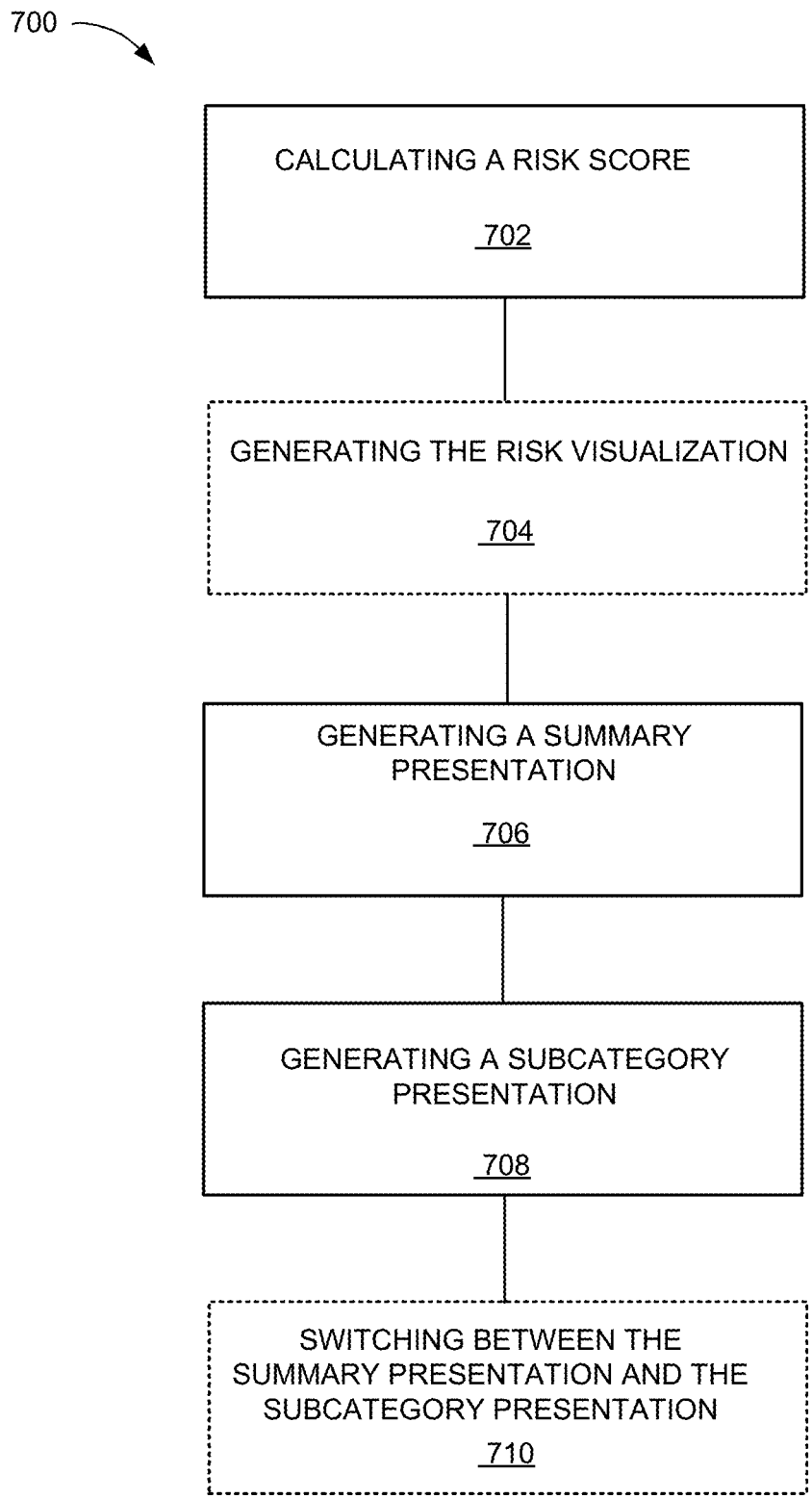
FIG. 7 is an exemplary flow chart of a method of operation of the electronic system of FIG. 1 in a further embodiment.

Referring now to FIG. 7, therein is shown an exemplary flow chart of a method 700 of operation of the electronic system 100 of FIG. 1 in a further embodiment. The exemplary flow chart 700 includes: calculating a risk score based on a permission requested by an application with a control unit in block 702; generating a summary presentation based on the risk score for presenting a risk visualization of a privacy risk posed by an application in block 706; and generating a subcategory presentation based on the risk score for presenting the risk visualization of the privacy risk posed to a device feature by the application for displaying the summary presentation, the subcategory presentation, or a combination thereof on a device in block 708.

The exemplary flow chart 700 can further include generating the risk visualization according to a visualization type for presenting a risk level in block 704 and switching between the summary presentation and the subcategory presentation based on a user input for presenting the privacy risk posed by the application in block 710.

It has been discovered that the electronic system 100 calculating the risk score 304 of FIG. 3 based on the permission 312 of FIG. 3 requested by the application 206 of FIG. 2 improves the safety of the user operating the first device 102 of FIG. 1, the electronic system 100, or a combination thereof. By generating the risk score 304, the electronic system 100 can generate the summary presentation 302 of FIG. 3 to present the risk visualization 202 of FIG. 2 for the privacy risk 204 of FIG. 2 posed by the application 206 of FIG. 2. Further, the electronic system 100 can generate the subcategory presentation 402 of FIG. 4 for presenting the risk visualization 212 of the privacy risk 204 posed to the device feature 320 of FIG. 3. As a result, the electronic system 100 can display the summary presentation 302 and the subcategory presentation 402 to inform the privacy risk 204 posed to the user, the first device 102, or a combination thereof for a safer operation of the first device 102, the electronic system 100, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a control unit including a processor configured to:
calculate a risk score based on a permission requested by an application,
generate a summary presentation based on the risk score for presenting a risk visualization of a privacy risk posed by the application,
generate a subcategory presentation based on the risk score for presenting the risk visualization of the privacy risk posed by the application to multiple instances of a device feature representing a functionality of a device, wherein one instance of the device feature has a privacy level different from the privacy level of another instance of the device feature, and
a user interface including a display, coupled to the control unit, configured to present a risk presentation including the summary presentation, the subcategory presentation, or a combination thereof for displaying on the device.

2. The system as claimed in claim 1 wherein the control unit is configured to generate the summary presentation including the risk visualization indicating a risk level of the privacy risk.

3. The system as claimed in claim 1 wherein the control unit is configured to generate the subcategory presentation including the risk visualization indicating a risk level of the privacy risk to the device feature.

4. The system as claimed in claim 1 wherein the control unit is configured to generate the risk visualization according to a visualization type for presenting a risk level.

5. The system as claimed in claim 1 wherein the user interface is configured to switch between the summary presentation and the subcategory presentation based on a user input for presenting the privacy risk posed by the application.

6. The system as claimed in claim 1 wherein the control unit is configured to calculate a feature specific score for determining a risk level of the device feature.

7. The system as claimed in claim 1 wherein the control unit is configured to calculate an overall score based on aggregating a plurality of the feature specific score for determining a risk level of the device.

8. The system as claimed in claim 1 wherein the control unit is configured to calculate a permission weight for the permission requested by the application to access the device feature.

9. The system as claimed in claim 1 wherein the control unit is configured to detect a request purpose by the application based on obtaining the permission from an application file extracted.

10. The system as claimed in claim 1 wherein the control unit is configured to calculate the risk score based on a permission weight, a purpose score of a request purpose, or a combination thereof to determine a risk level.

11. A method of operation of an electronic system comprising:
calculating a risk score based on a permission requested by an application with a control unit;
generating a summary presentation based on the risk score for presenting a risk visualization of a privacy risk posed by the application; and
generating a subcategory presentation based on the risk score for presenting the risk visualization of the privacy risk posed by the application to multiple instances of a device feature representing a functionality of a device, wherein one of the device feature having a privacy level different from the privacy level of another of the device feature for displaying the summary presentation, the subcategory presentation, or a combination thereof on the device.

12. The method as claimed in claim 11 wherein generating the summary presentation includes generating the summary presentation including the risk visualization indicating a risk level of the privacy risk.

13. The method as claimed in claim 11 wherein generating the subcategory presentation includes generating the subcategory presentation including the risk visualization indicating a risk level of the privacy risk to the device feature.

14. The method as claimed in claim 11 further comprising generating the risk visualization according to a visualization type for presenting a risk level.

15. The method as claimed in claim 11 further comprising switching between the summary presentation and the subcategory presentation based on a user input for presenting the privacy risk posed by the application.

16. A non-transitory computer readable medium including instructions for execution by a control unit, the instructions comprising:
calculating a risk score based on a permission requested by an application;
generating a summary presentation based on the risk score for presenting a risk visualization of a privacy risk posed by the application; and
generating a subcategory presentation based on the risk score for presenting the risk visualization of the privacy risk posed by the application to multiple instances of a device feature representing a functionality of a device, wherein one of the device feature having a privacy level different from the privacy level of another of the device feature for displaying the summary presentation, the subcategory presentation, or a combination thereof on the device.

17. The non-transitory computer readable medium as claimed in claim 16 wherein generating the summary presentation includes generating the summary presentation including the risk visualization indicating a risk level of the privacy risk.

18. The non-transitory computer readable medium as claimed in claim 16 wherein generating the subcategory presentation includes generating the subcategory presentation including the risk visualization indicating a risk level of the privacy risk to the device feature.

19. The non-transitory computer readable medium as claimed in claim 16, the instructions further comprising generating the risk visualization according to a visualization type for presenting a risk level.

20. The non-transitory computer readable medium as claimed in claim 16, the instructions further comprising switching between the summary presentation and the subcategory presentation based on a user input for presenting the privacy risk posed by the application.

* * * * *